United States Patent [19]
Kerker, Jr. et al.

[11] Patent Number: 5,812,137
[45] Date of Patent: Sep. 22, 1998

[54] COMPLIANT SECTIONING FACILITY FOR INTERACTIVE SECTIONING OF SOLID GEOMETRIC OBJECTS USING A GRAPHICS PROCESSOR

[75] Inventors: Robert Philip Kerker, Jr., Rhinebeck; Gerald Howard Ottaway, Pleasant Valley; Michael Thomas Peets, Staatsburg, all of N.Y.

[73] Assignee: International Business Machines Corporation, Armonk, N.Y.

[21] Appl. No.: 126,443

[22] Filed: Sep. 23, 1993

Related U.S. Application Data

[63] Continuation of Ser. No. 947,027, Sep. 17, 1992, abandoned, which is a continuation of Ser. No. 495,811, Mar. 19, 1990, abandoned.

[51] Int. Cl.[6] ................................................. G06T 17/10
[52] U.S. Cl. ............................................ 345/420; 345/434
[58] Field of Search .................... 364/522, 900 MS File; 340/729; 395/120, 134; 345/139, 420, 434

[56] References Cited

U.S. PATENT DOCUMENTS

| 4,649,498 | 3/1987 | Kedem et al. | 364/518 |
|---|---|---|---|
| 4,694,404 | 9/1987 | Meagher | 364/518 |
| 4,730,261 | 3/1988 | Smith | 364/521 |
| 5,278,983 | 1/1994 | Kawabe et al. | 395/120 |

FOREIGN PATENT DOCUMENTS 2194656  3/1988  United Kingdom .

OTHER PUBLICATIONS

Fuller, "USWG Autolad", Delmar Publishers, Inc. 1989, pp. 6–9 through 6–10.
"Shading by Texture Variation", IBM TDB, vol. 31, No. 9, Feb. 1989.
Mazumder, "Planar Decomposition for Quadtree Data Structure", Computer Vision, Graphics and Image Processing 38, pp. 258–274, 1987.
Illingworth et al. "A Survey of the Hough Transform", Computer Vision, Graphics and Image Processing, 44, pp. 87–116, 1988.
Mortenson, "Geometric Modeling", John Wiley & Sons, 1985 pp. 431–480.
Samet et al., "Efficient Component Labeling of Images of Arbitrary Dimension Represented by Linear Bintrees", IEEE Transactions on Pattern Analysis and Machine Intelligence, vol. 10, No. 4, Jul. 1988, pp. 579–586.

(List continued on next page.)

*Primary Examiner*—Mark K. Zimmerman
*Attorney, Agent, or Firm*—Lawrence D. Cutter

[57] ABSTRACT

A hierarchical data storage scheme associatively links a master solid object model in a graphics data processing system to a solid model of a sectioning object. The associative linking provides the capability of automatically generating sectioned views when the master object is modified. These views are generated at the operator's request without the necessity of having to apply sectioning objects to each one of the subsequent views. An interactive facility is provided for creating such structures.

6 Claims, 8 Drawing Sheets

OTHER PUBLICATIONS

Anand et al., "An Algorithm for Vertex Detection", Computers Ind. Engng, vol. 14, No. 2, pp. 77–83, 1988.

Cooper, "Accelerated Analysis of Occlusion", Image and Vision Computing, vol. 6, No. 1, Feb. 1988, pp. 3–12.

Farouki, "The Characterization of Parametric Surface Sections", Computer Vision, Graphics and Image Processing 33, pp. 209–236, 1986.

Farouki, "Trimmed Surface Algorithms for the Evaluation and Interrogation of Solid Boundary Representations", IBM Report RC–12052, Aug. 1986.

"Technique for Fast Drawing of Constructive Solid Geometry Objects", IBM TDB, pp. 32–33, vol. 31, No. 4, Sep. 1988.

Appel et al., "Generation of Solid Objects From Sketches", IBM TDB, vol. 21, No. 4, Sep. 1978, pp. 1734–1735.

IBM Technical Disclosure Bulletin, vol. 20, No. 6, Nov. 1977, Appel 'Computer Generation of Cross–Sectional Pictures' Figs. 2,3.

Data Report, vol. 11, No. 2, Jun. 1983, Germany Denner et al, A New Dimension in Design and Planning.

Siemins–Energy & Automation, vol. 9, Oct. 1987, Germany De La Chaux et al. More Effective Design with Sigraph––Cad.

Hewlett–Packard Journal, vol. 38, No. 5, May 1987, USA, Werner et al. ME CAD Geometry Construction Dimensioning, Hatching, and Part Structuring.

COMPLIANT SECTIONING FACILITY FOR INTERACTIVE SECTIONING OF SOLID GEOMETRIC OBJECTS USING A GRAPHICS PROCESSOR

This is a continuation of application Ser. No. 07/947,027 filed on Sep. 17, 1992, now abandoned, which is a continuation of Ser. No. 07/495,811 filed on Mar. 19, 1990, now abandoned.

BACKGROUND OF THE INVENTION

The present invention is generally directed to the interactive manipulation of solid models in a graphics processor. More particularly, the present invention is related to the sectioning of solid models in a consistent fashion. Even more particularly, the present invention provides a method, data structure and apparatus in which sectioning objects are associatively linked to a base model so that subsequent modifications to the base model are reflected in a variety of sectioned views without significant operator intervention.

Computer aided drawing devices have been found to provide a great deal of flexibility in design and engineering environments. Even more so, graphic display processors operating to produce views of solid objects have become increasingly important in industrial design and development. In particular, solid three-dimensional modelling methods and devices have become increasingly important in robotic simulation and in the design and manufacture of parts and tools. Such systems provide critical information about parts assembly, layout, machining and clearances. It should however be particularly noted that while solid modelling systems typically display results on a two-dimensional screen such as a cathode ray tube, the internal models which are represented include full three-dimensional information about the object being viewed. In facilitating improved and automated manufacturing methods and technologies, such solid modelling systems are becoming increasingly important. It is therefore desirable that these systems be made to operate in effective and efficient ways so as to minimize operator intervention and unnecessary errors due to the proliferation of many views, particularly sectioned views.

Accordingly, the present invention relates to the creation of solid models and their display in computer graphics systems. In general, there are two structures used for representing solid objects for manipulation and display in graphics processing systems. In a first of these methods, an object is represented by the elements which specify its boundaries. This particular data structure is accordingly referred to as the "boundary representation" or "B-rep" model. Such models employ faces, edges and points.

In a second solid model representational schema, solid objects are represented as composites of simpler objects such as cylinders, spheres and parallelepipeds. In this latter representational mode the object is constructed from Boolean logic combinations of such predefined primitives. Such models are referred to as constructive solid geometry" (CSG) representations. With respect to the present invention, it is noted that it is applicable to both the constructive solid geometry modelling schema and the boundary representation modelling schema.

Solid models are particularly useful for a number of purposes. In particular, they permit the display of either shaded or wire-frame images on a computer screen or other output medium. Typically, such images are generated by a dedicated graphics processing system although it is also possible to employ more general purpose digital computers for this purpose including even entry level personal computing systems. Such models permit the manipulation of data so as to depict the object from many views with different light sources and in conjunction with other objects. In particular, such solid modelling systems are useful in the design and control of robotic systems or tool controllers. Such models are also useful in the manufacture of parts, for producing part lists, part counts and for determining part fit and clearance. Additionally, such solid models are useful for the calculation of a wide variety of physical parameters associated with the object including moments of inertia, volume, mass, surface area, density and center of mass.

Because solid modelling and graphics processing systems operating on solid model data structures have proven to be so effective and useful in the design of complicated mechanical systems, the use of solid modelling techniques has greatly expanded both in the extent of the applicability and in the level of complexity of the systems which they model. It is therefore becoming more and more important for such systems to be able to create, display and manipulate sectioned views of objects. Moreover, in order to adequately show views of certain objects, complicated sectional representations must be employed. Typically, each of these representations has required the construction (and maintenance) of an additional solid model to represent the material contained in that section. Furthermore, in order to provide an adequate understanding of the construction and/or operation of a particular object it is often necessary to view the object from a number of different perspectives and/or to provide a number of different lighting conditions for different views of the object. Thus, from a single base or master geometric object represented in a solid modelling system, a large plurality of views and models must often be generated and stored. Moreover, significant problems of control and consistency arise when the base or master object is modified. The present invention is particularly directed to the solution of problems in this area.

Additionally, sectioning objects typically have been limited to flat planes and have not been defined in the context of the master part. Typically such sectioning planes, when they exist, are defined in and of themselves without any association with the part being sectioned. In particular, sectioning objects have generally been limited in their own complexity and have not been defined in the context of the part that is being sectioned. It may be easier to comprehend the scope of the problem when one considers that for a particular complex model there might exist 88 different views with over 50 sectioning planes being applied to the object. The data management and control problem is accordingly seen to be quite extensive when one considers modifications to the base object or to the collection of objects being modelled.

SUMMARY OF THE INVENTION

In the present invention the sectioning object is itself provided as part of the hierarchical data structure used to define the object. In this way the solid being modeled is automatically combinable with the sectioning object to create a different object. The designer now does not have to repeatedly section various projections of the model. Doing it that way has led to the generation of too many sectional objects and has raised problems of consistency especially when the base object is changed. These problems are now eliminated by establishing the sectioning object as part of the object data structure.

In accordance with a preferred embodiment of the present invention, a method of operating a graphics display system to facilitate the creation and display of sectioned views of solid objects is provided. The method comprises a plurality of steps the first of which is defining a base model or accessing a preexisting base model of an object which is to be displayed in a sectioned view. Next, a solid model of a sectioning object is also defined (or accessed) and is associatively linked to the base model. In preferred embodiments of the invention, the model of a sectioning object is defined in the context of the base model. Thus the sectioning object and the object being modelled are simultaneously visible to the user. Next, a graphics system operator preferably specifies a desired sectioning operation. Next, a base model view is sectioned in accordance with the sectioning object and optional operator provided hatching and viewpoint parameters. The view is thus generated and displayed. The view includes the sectioning object, the view parameters and the hatching parameters. Lastly, the view is stored so as to associate the view with the base object thus providing a mechanism whereby subsequent views of the object may be automatically generated having the same sectioning.

In accordance with another aspect of the present invention, there is provided a method of storing data in a graphics display system so as to facilitate the creation and display of sectioned views of a solid object. This method includes storing a base model which is representative of an object to be displayed in a sectioned view. Next, a section view is associatively linked with a model of the sectioning object used to define the desired section which is stored so that the sectioning object is now linked to the base object. A view of the base object and a section(ed) view may also be generated in accordance with the sectioning object and an appropriate view description including hatching patterns and viewpoint parameters. Lastly, the generated view is stored so as to be associatively linked to the base object. Again this permits subsequent (section) views of the object to be automatically generated in the same manner despite changes in the base object.

Accordingly, it is an object of the present invention to provide a method for the creation of sectioning objects in a solid modelling system in the context of the part being sectioned.

It is also an object of the present invention to provide a data structure which is particularly suitable for the display and manipulation of various sectioned views of a solid object being modelled.

It is yet another object of the present invention to provide a consistent and controlled set of sectioned views of an object especially under those circumstances in which modifications are made to the base object.

It is still another object of the present invention to provide a mechanism for associating views with sectioned objects so that in subsequent views the objects are automatically sectioned.

Lastly, but not limited hereto, it is an object of the present invention to provide a method for operating a graphics display system to facilitate the creation and display of sectioned views of solid objects with minimal operator intervention particularly with respect to associating sectioning objects with the base objects.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
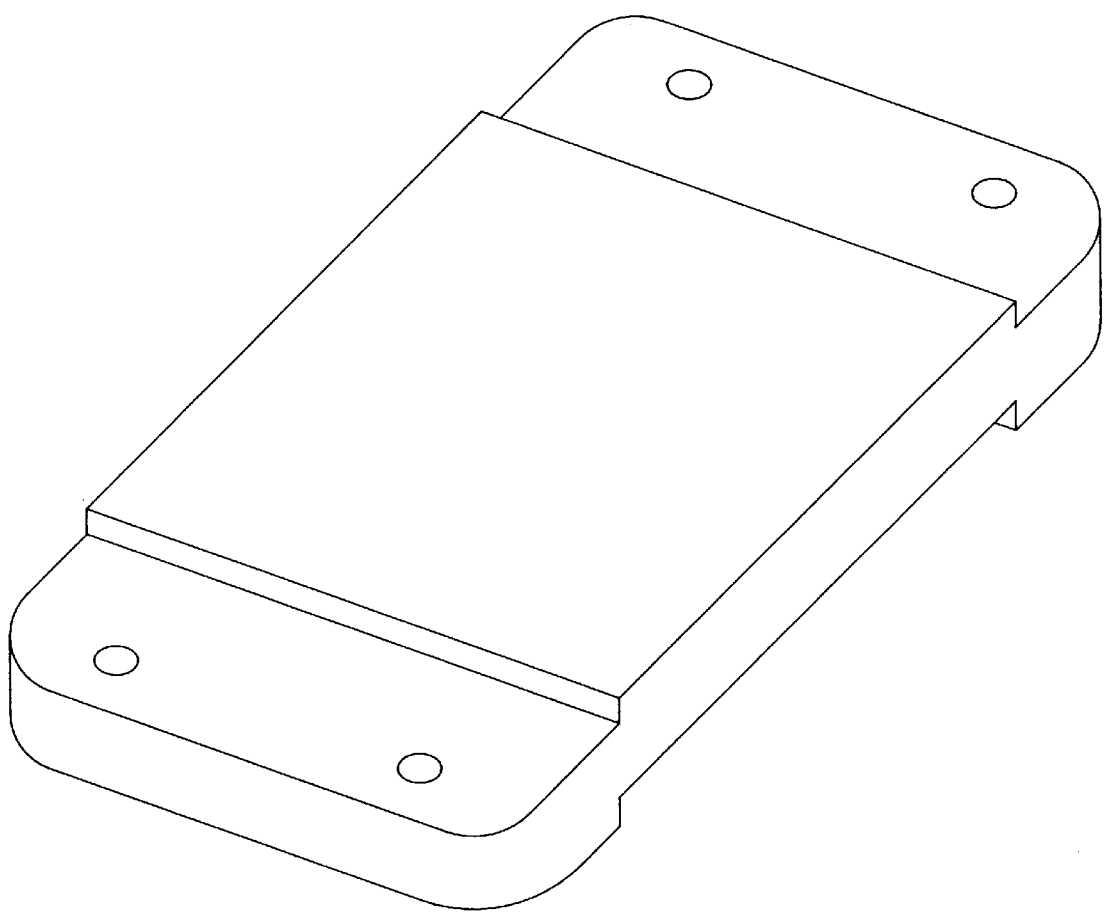
FIG. 1A is an isometric view of a base object which may be represented as a solid model and manipulated in accordance with the present invention.

In constructive solid geometry representations, the object to be modelled is stored internally in a data processing system as a tree structure. For example, the end nodes of the tree represent solid primitive objects such as cylinders and parallelepiped. Further up the tree from the leaves, various nodes represent certain Boolean operations which are to be performed so as to generate increasingly complex objects as one moves from the leaves of the tree up to its root node representing the complete object itself. It is data structures such as this which are operated upon by solid model geometry processors to produce views of an object from various directions and under various lighting conditions. However, such data structures are limited to primitive solids and Boolean operations. There are no means provided for linkage to a sectioning object.

In constructive solid geometry, various Boolean operations are employed as a mechanism for constructing more complicated models from the primitives. The set operations employed generally include set union, set difference and set intersection. Set union operations for example can be employed to "tack on" one object in an adjacency relationship to another object. Likewise, set differencing operations, particularly with cylinders, are employed to create holes in objects. Such holes would typically be formed by drilling operations extending through slabs. Additionally, set difference operations may also be employed to form "hollow" solids such as the one formed by the set difference between two concentric spheres having somewhat different radii.

In any event, it is through such tree structures that objects are represented, processed and ultimately displayed on a screen either in wire-frame form or in a shaded and/or colored form representing the view from a particular direction as defined by an observers coordinate location.

However, in accordance with the present invention a more complicated data structure is involved. In particular, in the present structure only one portion of the stored information is specifically directed to the geometry of the model itself. Furthermore, the present data structure provides linking to other complete solid geometry models. A hierarchical description of the data structure of the present invention, indicating how section(al) views are stored, is presented in the table below:

TABLE I

| | |
|---|---|
| Level 1: | a complete solid qeometry model |
| Level 2: | name of the model |
| Level 2: | geometry of the model |
| Level 2: | views of the model |
| Level 3: | front view of the model |
| Level 4: | name of the view |
| Level 4: | orientation of the "camera" |
| Level 4: | scale |
| Level 3: | section side view of the model |
| Level 4: | name of the view |
| Level 4: | orientation of the "camera" |
| Level 4: | scale |
| Level 4: | geometry of the sectioning object |
| Level 4: | hatching parameters. |

In the table above, it is to be particularly noted that at Level 4 there is a reference to a sectioning object which comprises a complete solid geometry model in and of itself. Thus, the sectioning object is directly linked to the base or master solid model. Thus the view of the model can apply the sectioning object directly. Moreover, each sectioning object can be defined on the screen in the context of the object being sectioned.

Thus, in the present invention the key aspects are the sectional facility, the view, and the sectioning object. In this regard, it should be remembered that a view is the collection of all of the information necessary for the generation of a particular drawing of that part. The view includes drawing mode (such as hidden line versus wire-frame), part orientation, scale and other special annotations. The sectioning object is a solid, which when combined with the part, produces the geometry required by the section. The sectioning object specifies what material is kept and what material is removed.

The sectioning facility provides a user with the ability to interactively create a sectioning object within the context of the part that is being sectioned. In short, it can be assigned its own data structure and geometry separate and apart from the base model itself. Thus, if a view containing a sectioning object is drawn, the sectioning operation may therefore then be performed automatically.

Furthermore, if it is decided at some subsequent time that a sectioning object itself must be changed it is possible to edit a section. In this case, in order to edit a section, the user first draws the section view and then asks that the model be unsectioned. The unsectioning function restores the original solid geometry and displays the sectioning object in context with that geometry. This split can be done easily and effectively because of the data structure provided. The user can then edit the sectioning object in the same way that he would edit any other solid model. This then provides the user of the solid modelling system with the ability to create sections of a part which are automatically updated when part geometry changes.

Figure 1B:
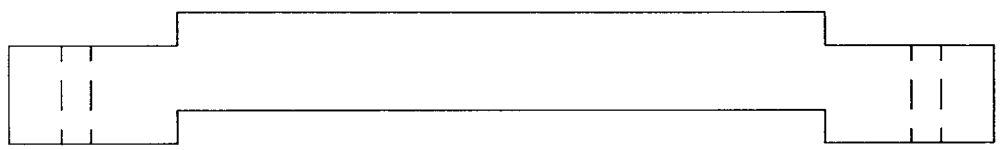
FIG. 1B is a side elevation view of the object shown in FIG. 1A.
Figure 1C:
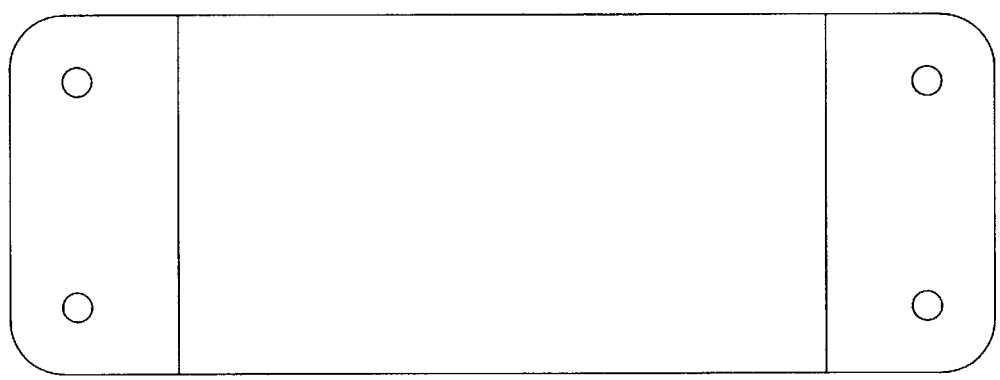
FIG. 1C is a plan view of the object shown in FIG. 1A.
Figure 2:
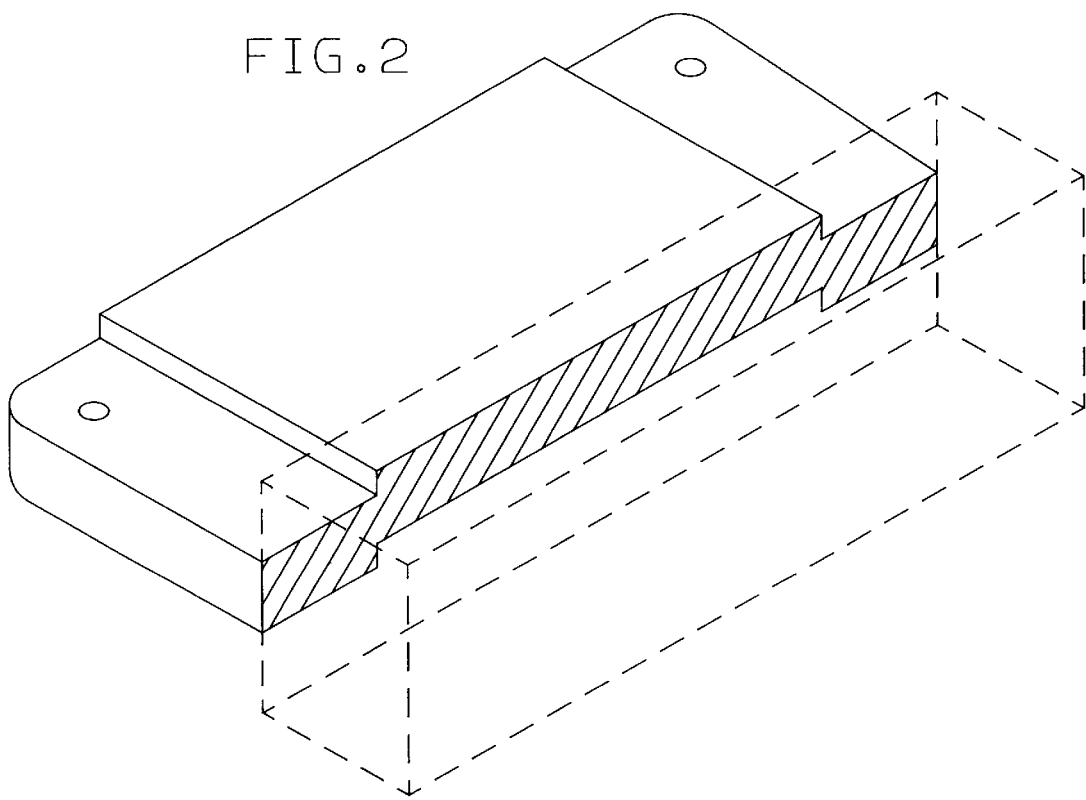
FIG. 2 is an isometric view illustrating a first sectioned view of the object in FIG. 1 together with an appropriate sectioning object (shown in phantom view)
Figure 3:
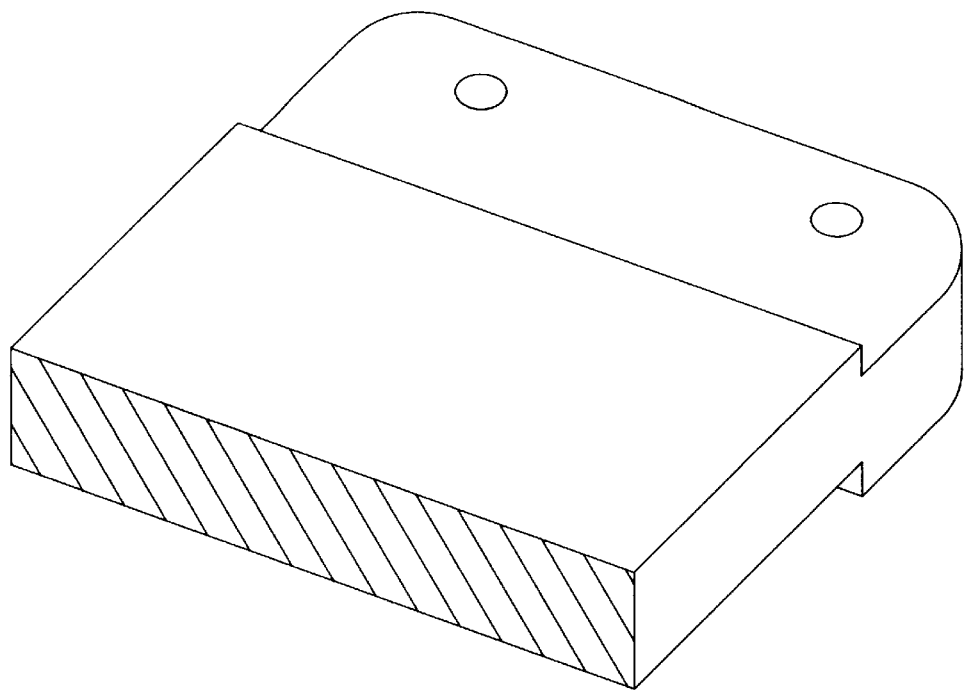
FIG. 3 is an isometric view of a differently sectioned view of the same object from FIG. 1.
Figure 4A:
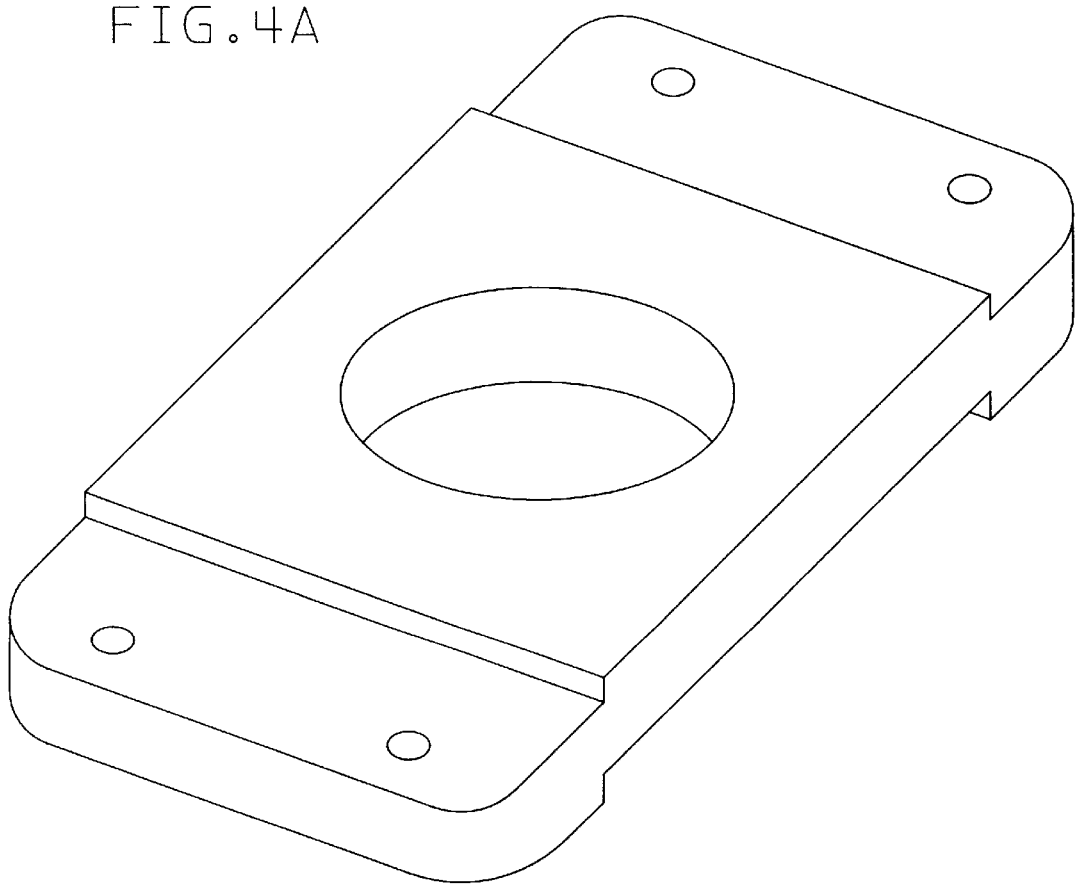
FIG. 4A is an isometric view illustrating a base object which has been modified.
Figure 4B:
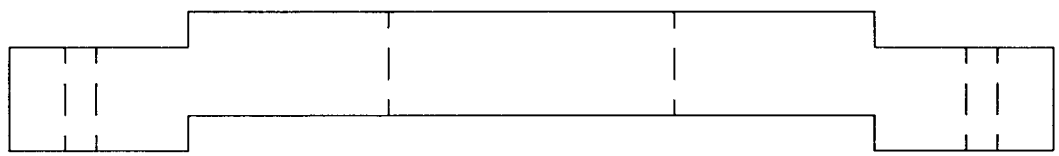
FIG. 4B is a side elevation view of the object seen in FIG. 4A.
Figure 4C:
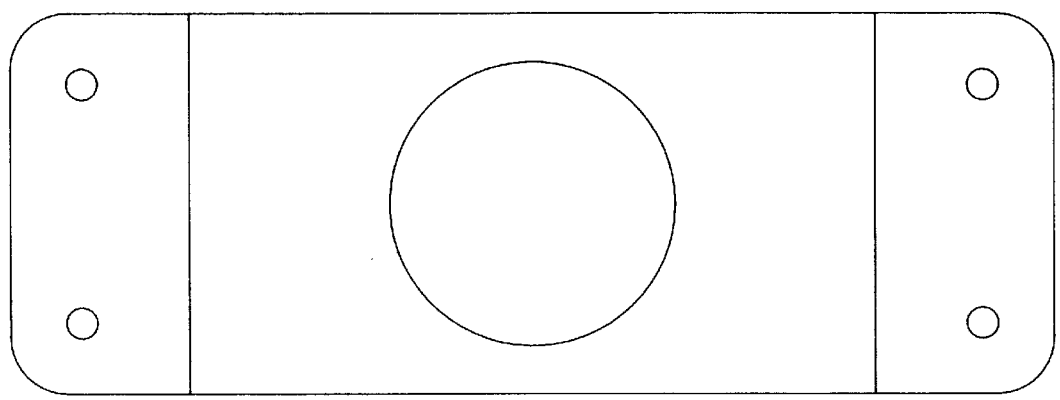
FIG. 4C is a plan view of the object shown in FIG. 4A.
Figure 5:
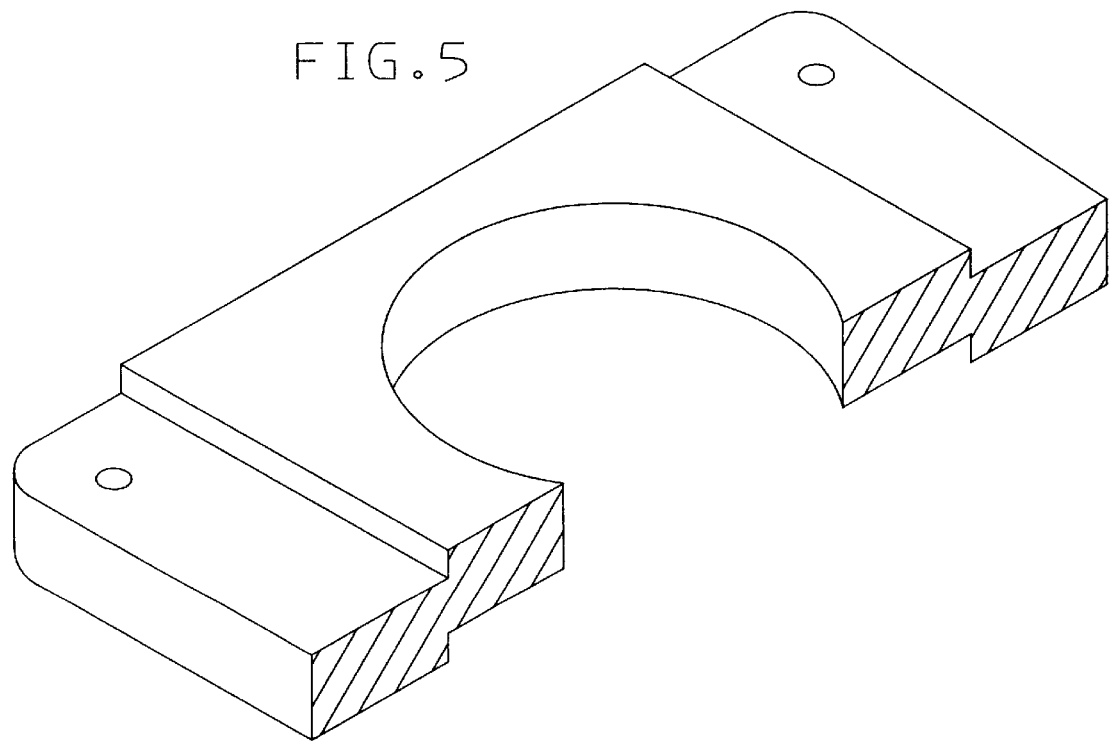
FIG. 5 is an isometric view similar to FIG. 2 but illustrating a sectioned view of the modified object, such a view being typical of those which may be automatically generated by the present invention.
Figure 6:
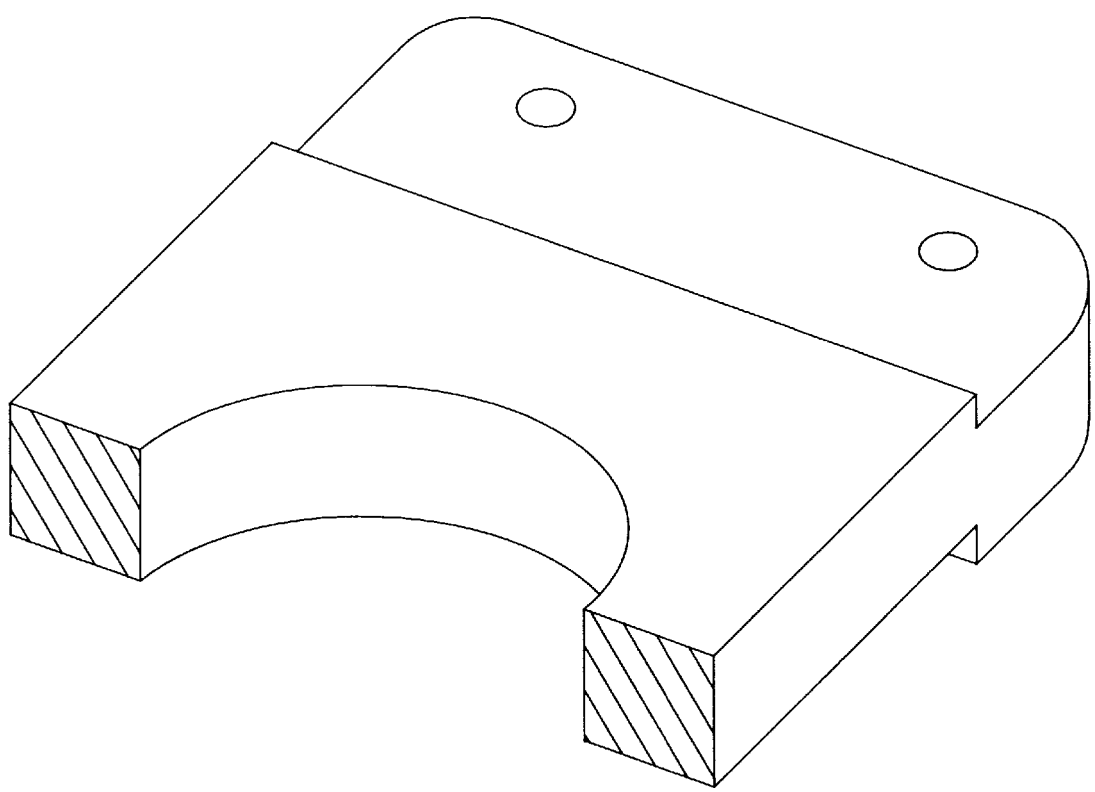
FIG. 6 is a section view similar to FIG. 3 but illustrating a different view of the modified base object, again this view being generated automatically in accordance with a sectioning object specified in accordance with the present invention.

An example of this functioning is provided in FIGS. 1 through 6. FIG. 1A illustrates an isometric view of an object which may be sectioned in several ways. One of the ways of sectioning this object is illustrated in FIG. 2. In particular, a sample sectioning object is shown in phantom view. Another way of sectioning this same object is shown in FIG. 3. However, if a modification is made to the master part (base model) shown in FIG. 1, such as by providing a large central aperture, as shown in FIG. 4A, the system of the present invention can automatically generate FIGS. 5 and 6 sectioned in appropriate ways with minimal operator intervention or effort.

In the figures above, it should be noted that the plan and side views are shown to more clearly depict the object being shown. It should also be appreciated in these figures that the particular solid model selected has been chosen primarily for purposes of facilitating the understanding of the present invention. In general, much more complex master objects and sectioning objects would be employed. However, primarily because of the increased complexity of the object, it should be appreciated that a large plurality of views would often be necessary. Such additional views would show up as additional level 3 nodes in the hierarchy illustrated in Table I.

Typically, during the operation of systems employing the present invention the operator declares that a section view or a set of section views is desired. Then, the operator creates a second solid, namely the sectioning object. The operator then specifies a particular Boolean operation such as set intersection or difference. The operator then specifies a desired viewpoint and also hatching parameters such as the angle, spacing and type of hatching. The view is named and stored by the system. Furthermore, the system associates the sectioning object with the named view. Subsequent views of the object can therefore be automatically updated when the base model is changed. It is noted that all of these operations are done interactively and can be done in the context of the object being sectioned. In particular, it is seen that many of the advantages of the present invention are achieved by the associative linking process illustrated in Table I. Moreover, as used here and in the appended claims, the term "associative linking" is applied to any method for linking together the sectioning object and the geometry of the model object. This linkage may be made directly or indirectly through pointers or other references. It may be established by specification of starting and offset references or by any other method employed in the design of data processing systems for establishing linkage between two entities.

Figure 7A:
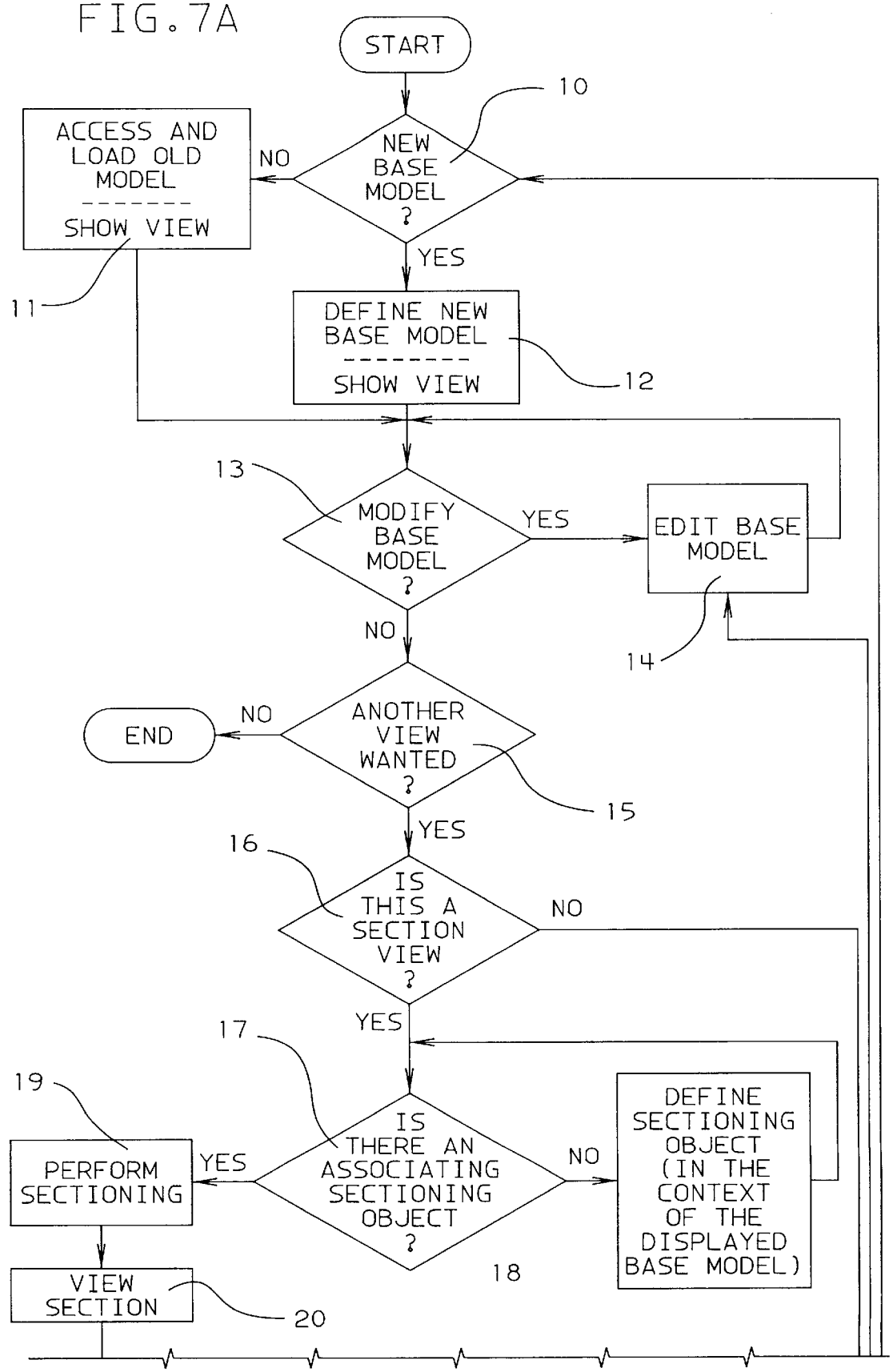
FIGS. 7A and 7B show a flowchart schematically illustrating process steps carried out in accordance with the present invention.
Figure 7B:
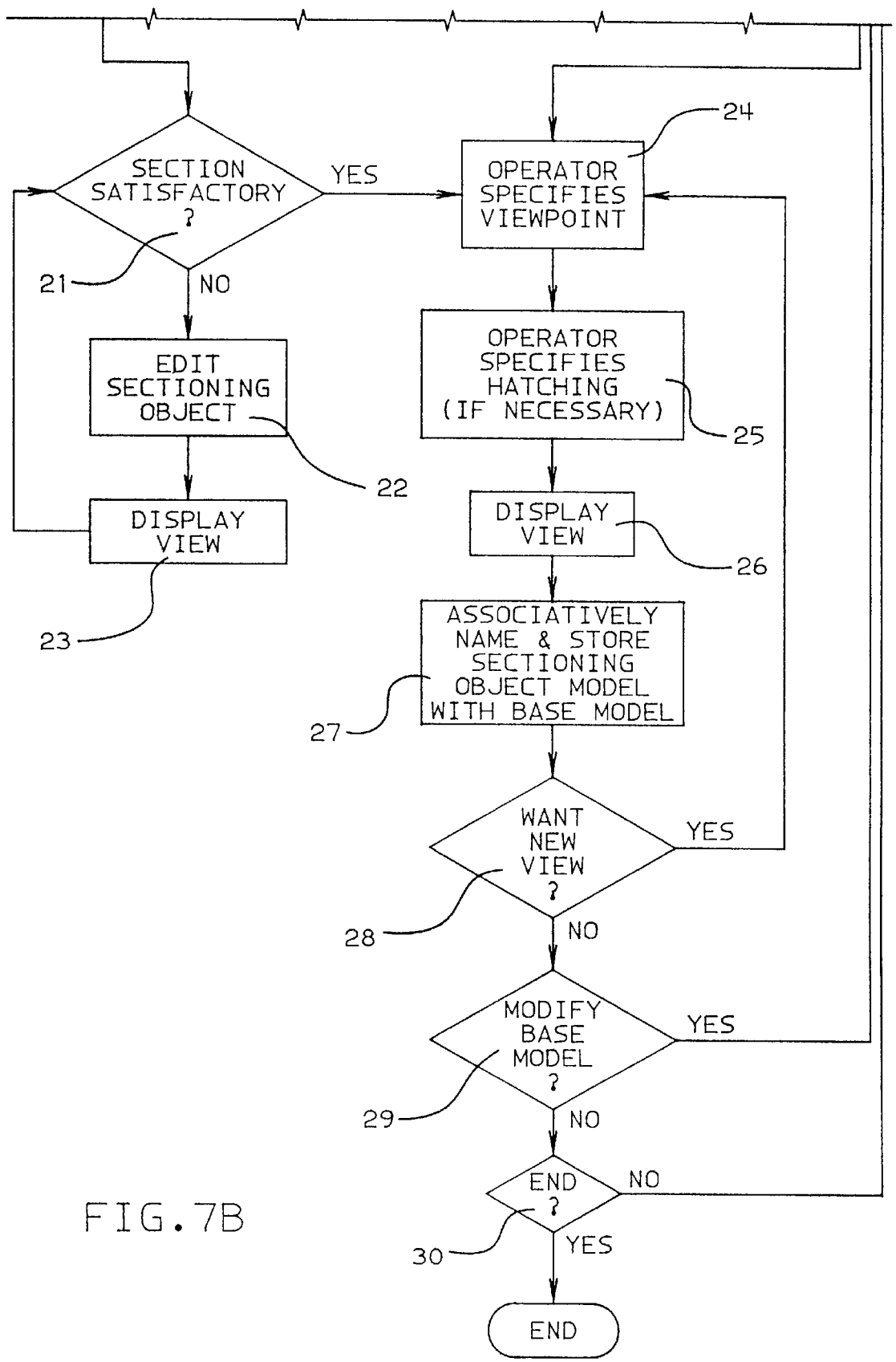

FIGS. 7A and 7B (collectively referred to herein as FIG. 7) illustrate a process flow path for the operation of the present invention. In particular, an operator based decision relating to whether or not a new base model is needed is addressed in step 10. If no new base model is needed, a request is made to access and load an old base model (step 11) and a view of that model is shown. However, if a new base model is desired, one is defined (step 12) and its view shown. If it is desired to modify the current base model (step 13), transfer of control is made to a base model editor (step 14) where changes in the base model can be made. If the base model is still not satisfactory, repeated access to the base model editor may be made. However, if the model is satisfactory, an inquiry as to whether or not another view is desired may be made (step 15). If not, the process ends. If another view is desired however, an inquiry is made as to whether or not the desired view is a sectioned view (step 16). If the desired view is not a sectioned view, a process flow and control continues in step 24 (see below), otherwise a determination is then made as to whether or not there is a sectioning object associated with the solid model (step 17). If there is not a sectioning object and one is desired, a sectioning object is defined (step 18). Preferably, the definition of a sectioning object is carried out in the context of the displayed base model. In particular, in the present invention the sectioning object is treated as a solid object in its own right but is nonetheless linked to the model of the base object for reasons of consistency and base object variability. Once a sectioning object is satisfactorily defined, sectioning is performed (step 19) and the sectioned object is viewed (step 20). If the sectioning is satisfactory, processing continues as described in step 24 below. However, if the sectioning is not satisfactory, the sectioning object itself may be edited in the same way that the base object may be edited (step 22). The results of the sectioning object editing are then displayed (step 23) and again a determination is made (step 21) as to whether the sectioning has been accomplished successfully.

Once a satisfactory sectioning object has been defined or it has been decided that a section view is not desired or required, the process flow continues with step 24 in which the operator specifies a desired viewpoint. Thereafter, the operator also has the option to specify hatching parameters for the sectioning view (step 25). The view is then displayed (step 26). In particular, in the present invention the name of the view is stored and associatively linked into the model (step 27). This provides an efficient mechanism free from operator error for changing the base model without requiring changes to be made in each of many corresponding views. If a new view is required (step 28), the procedure continues at step 24. If a new view is not required, but it is desired to modify the base model (step 29), process flow control continues with step 14 (editing the base model, described above). If a new view is not required and it is not desired to modify the base model, it is determined whether or not to end the procedure (step 30). If desired, the procedure is terminated. However, if it is not desired to terminate at this point, control may continue at step 10 to determine whether or not to initiate processing with a new base solid model.

Figure 8:
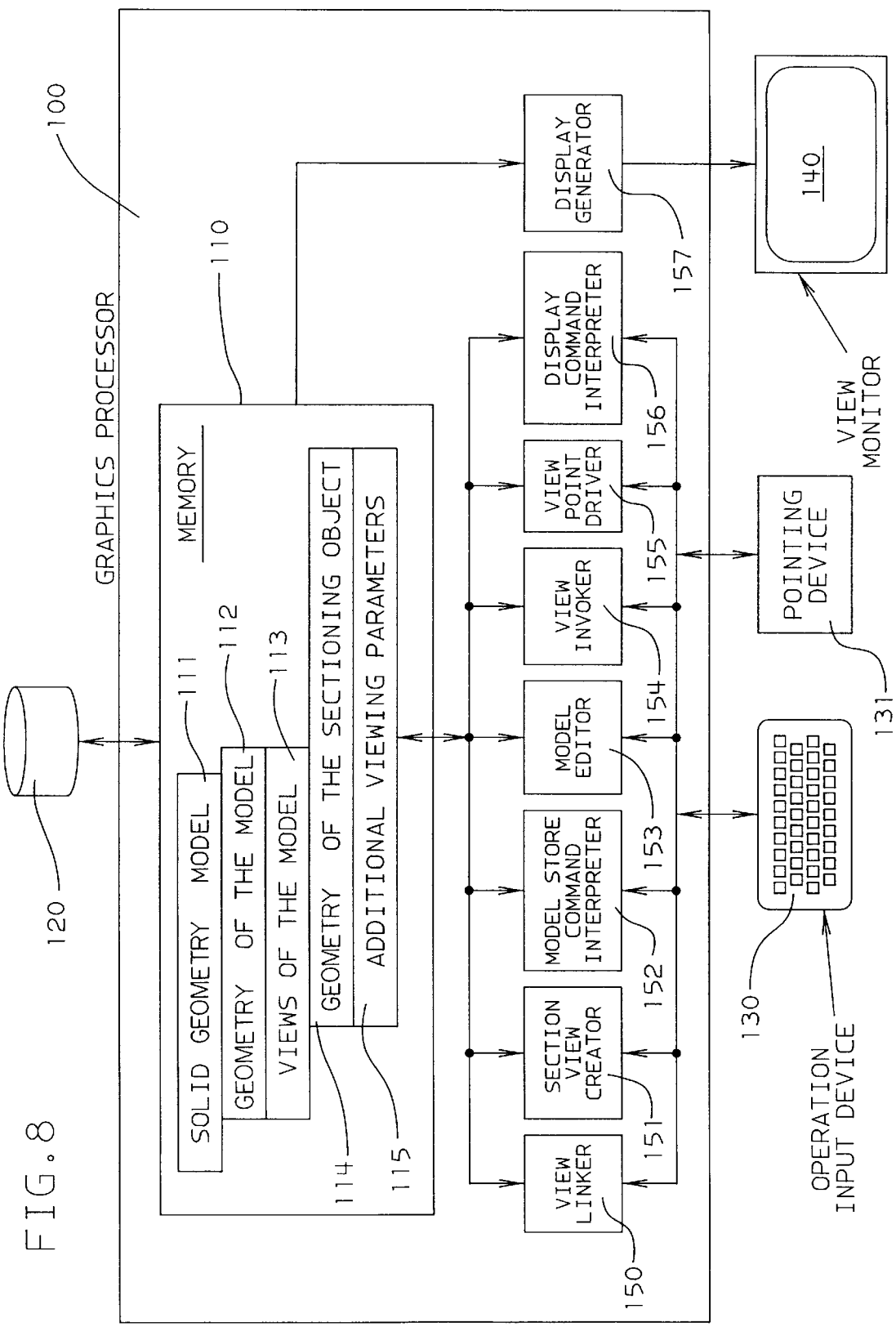
FIG. 8 is a block diagram of a graphics processing system in accordance with the present invention.

A system for carrying out the process flow shown in FIG. 7 is more particularly illustrated in FIG. 8. More particularly, FIG. 8 illustrates a block diagram of a graphics display processor in accordance with a preferred embodiment of the present invention. More particularly, graphics processor 100 is seen to include memory 110 capable of holding editable representations of the solid base and sectioning models. These models are also typically stored on longer term memory devices such as disk drives 120. Communication between processor 100 and the user occurs chiefly through the operation of an input device such as keyboard 130 and view monitor 140. The input device can also include either a separate or integrated pointing device 131 such as a mouse, trackball, light pen or the like for controlling cursor movement, function and object selection.

Memory 110, typically receiving model information from direct access storage device 120, preferably stores model information in the hierarchical format specified in Table I above. In particular, the hierarchical data structure includes the overall solid geometry model 111 which includes the specific geometry of the model 112 along with views of the model 113. Furthermore, below the level representing views of the model, there is also included the geometry of the sectioning object 114 along with additional viewing parameters 115. It is this memory resident data structure with which various other program structures interact to produce the desired monitor display and associatively linked models and sectioned views. See also the discussion above with respect to Table I.

Means are also provided to permit the user to interact with the display and the modelled solid object. This interaction is typically and preferably provided by means of program modules 151 through 157 shown in FIG. 8. More particularly, VIEW LINKER 150 provides the mechanism which takes the current view parameters which include the scale drawing mode and sectioning object and links them into the model as shown in Table I. The SECTIONING VIEW CREATOR 151 provides the mechanism which allows the user to create a sectioning object interactively and then produces a sectioning view which utilizes this object. The sectioning object geometry is specified in the context of the base solid model itself. MODEL STORE AND COMMAND INTERPRETER 152 operates to receive commands from input device 130 and to control and access memory 110 and storage device 120 in response to standard commands provided by the user. MODEL EDITOR 153 accepts editing commands from input device 130 and is utilizable to operate upon both the base model and the sectioning object. VIEW INVOKER 154 provides for reinstatement of the view using parameters which have been previously saved. VIEW POINT DRIVER 155 accepts information from input device 130 concerning view orientation and direction and accordingly also interacts with DISPLAY GENERATOR 157 to produce a screen view of the desired object. DISPLAY COMMAND INTERPRETER 156 accepts information from input device 130 for the purpose of interactively controlling how DISPLAY GENERATOR 157 interprets the data contained within solid geometry model 111 in memory 110. DISPLAY GENERATOR 157 renders the data structure description of the geometry of the model as edges or filled polygons which are displayed on monitor 140. At the expense of reduced response times, these renderings can even be provided in hidden line or hidden surface mode.

From the above, it should therefore be appreciated that the present invention provides significant benefits to individuals working with solid modelling systems. In particular, it is seen that the present invention permits the modification of a base part and yet at the same time permits the automatic generation of multiple sectioned views based upon a sectioning object created in the context of the part being sectioned and viewed. It is seen that the system of the present invention provides the user with significantly more freedom in terms of managing changes in solid models. Furthermore, it is seen that the invention allows the creation of a sectioning object separate and apart but linked to the model so as to facilitate the creation of exactly the correct section desired by the user which most accurately facilitates the view that the user wishes to depict.

EXAMPLE

CSG Data Structure for Object in FIG. 1

Below is a description of the tree associated with the model "BASE". The geometry associated with BASE, which is shown at level "1" in the tree, is generated by doing a Boolean combination of the geometry associated with 7 primitives which are shown at level "2" in the tree. The geometry of primitive objects is based directly on user-defined parameters, rather than a Boolean combination of lower-level objects. The BASE model has a primitive cuboid in the middle, and two laminums on the front and the back. A cuboid is an orthographic parallelogram. A laminum is an extrusion of a user-defined two-dimensional profile. The BASE model also has 4 holes. The holes, in this case, are constructed using cylinders with a negative Boolean polarity. As shown in the tree, the color of an object, which was created from a Boolean combination of lower-level objects, can be different from the color on any of the lower-level objects.

|                |                        |
|----------------|------------------------|
| 1-BASE         | (PART WHITE)           |
| 2-MIDDLECUBE   | (CUBOID AQUA)          |
| 2-FRONTLAMIN   | (LAMIN YELLOW)         |
| 2-BACKLAMIN    | (LAMIN YELLOW)         |
| 2-LEFTFRONT    | (CYLNDR NEGATIVE RED)  |
| 2-RIGHTFRONT   | (CYLNDR NEGATIVE RED)  |
| 2-LEFTBACK     | (CYLNDR NEGATIVE RED)  |
| 2-RIGHTBACK    | (CYLNDR NEGATIVE RED)  |

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method of operating a graphics display system to facilitate creation and display of sectional views of solid objects, said method comprising the steps of:

defining a base model or accessing a pre-existing base model of a solid object to be displayed in a sectional view;

defining a model of a sectioning object or accessing a pre-existing model of a sectioning object;

specifying a desired Boolean logic operation for applying said sectioning object model to said base model;

generating a hierarchically combined model of said solid object for subsequent generation of at least one view of said object, said combined model incorporating both said base model and said sectioning object model, for sectioning in accordance with said sectioning object model and in accordance with said Boolean logic operation as applied to said base model;

modifying said sectioning model while simultaneously viewing said base model;

modifying said base model within said hierarchically combined model;

generating at least one sectioned view of said solid object as represented by said modified base model and said modified sectioning object model.

2. The method of claim 1 further including the step of storing specified cross hatching parameters for describing surfaces resulting from application of said sectioning model to said base model.

3. The method of claim 2 further including the step of displaying said sectioned base model in accordance with said hatching parameters.

4. The method of claim 1 further including the step of storing specified viewpoint parameters for describing a point in space from which said solid object is to be depicted.

5. The method of claim 4 further including the step of displaying said sectioned base model in accordance with said viewpoint parameters.

6. A method of storing data in a graphics display system to facilitate creation and display of sectional views of a solid object, said storage method comprising the steps of:

storing a base model representative of a solid object which is to be displayed in a sectional view;

storing a model of a sectioning object defining, with said base model, a desired sectional view of said solid object;

generating a hierarchically combined model of the solid object, in a form suitable for subsequent generation of at least one view of said solid object, said combined model incorporating both said base model and said sectioning object;

modifying said model of a sectioning object while simultaneously viewing said base model;

modifying said base model within said hierarchically combined model; and storing said combined model.

* * * * *